(12) United States Patent
Cheng et al.

(10) Patent No.: US 6,355,534 B1
(45) Date of Patent: Mar. 12, 2002

(54) VARIABLE TUNABLE RANGE MEMS CAPACITOR

(75) Inventors: Peng Cheng, Campbell; Qing Ma, San Jose, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/491,560

(22) Filed: Jan. 26, 2000

(51) Int. Cl.[7] .............................................. H01L 21/20
(52) U.S. Cl. ..................... 438/379; 333/24 C; 327/566; 29/25.42
(58) Field of Search .................. 438/48, 379; 333/24 C; 29/25.42; 327/566

(56) References Cited

U.S. PATENT DOCUMENTS

| | | |
|---|---|---|
| 3,341,794 A | 9/1967 | Stedman |
| 3,648,340 A * | 3/1972 | MacIver ..................... 438/379 |
| 3,917,964 A * | 11/1975 | Carlson ...................... 327/566 |
| 4,236,137 A | 11/1980 | Kurtz et al. |
| 4,697,159 A * | 9/1987 | Sechi et al. ............... 333/24 C |
| 5,619,061 A | 4/1997 | Goldsmith |
| 5,963,788 A * | 10/1999 | Barron et al. .................. 438/48 |
| 6,110,791 A * | 8/2000 | Kalnitsky et al. ........... 438/379 |

OTHER PUBLICATIONS

Kevin F. Harsh et al., "Flip–Chip assembly For Si–Based RF MEMS", IEEE, MEMS '99 Conference, 12th Intl. Conference, pp. 273–278, Dec., 1999.*

L. Fan, et al., Universal MEMS Platforms For Passive RF Components: Suspended Inductors And Variable Capacitors, IEEE, Micro Electro Mechanical Systems, pp. 29–33, Dec., 1998.*

Chiao et al., "MEMS Millimeterwave Components", IEEE MTT–S, pp 463–466, May 1999.*

Wu, et al., "MEMS Designed For Tunable Capacitors", IEEE MTT–S pp 127–129, May 1998.*

Gianchandani et al., "A MEMS–First Fabrication Process For Integrating CMOS Circuits with Polysilicon Microstructures", IEEE, Micro Electro Mechanical Systems, pp 257–262, Dec. 1998.*

Zhang et al., "Submicron, Movable Gallium Arsenide mechanical Structures and Actuators" IEEE Micro Electro Mechanical Systems, pp. 72–77, Feb. 1992.*

Harsh, K.F. et al., "The realization and Design Considerations of a Flip–Chip Integrated MEMS Tunable Capacitor" Proceedings of 12th Int'l Workshop on Micro Electro Mechanical Systems, MEMS, Orlando, FL Jan. 1999, vol. A80, No. 2., pp. 108–118, XP0041192096, Sensors and Actuators A (Physical Mar. 2000, Elsevier, Switzerland.

International Search Report, PCT/US02202, Jan. 22, 2001.

* cited by examiner

Primary Examiner—Long Pham
Assistant Examiner—William David Coleman
(74) Attorney, Agent, or Firm—Blakely, Sokoloff, Taylor & Zafman LLP

(57) ABSTRACT

The invention relates to a variable capacitor and method of making it. The variable capacitor comprises a fixed charge plate disposed in a substrate, a movable charge plate disposed above the fixed charge plate, and a stiffener affixed to the movable charge plate. The movable charge plate may be patterned to form a movable actuator plate where the fixed charge plate is elevated above a fixed actuator plate.

32 Claims, 9 Drawing Sheets

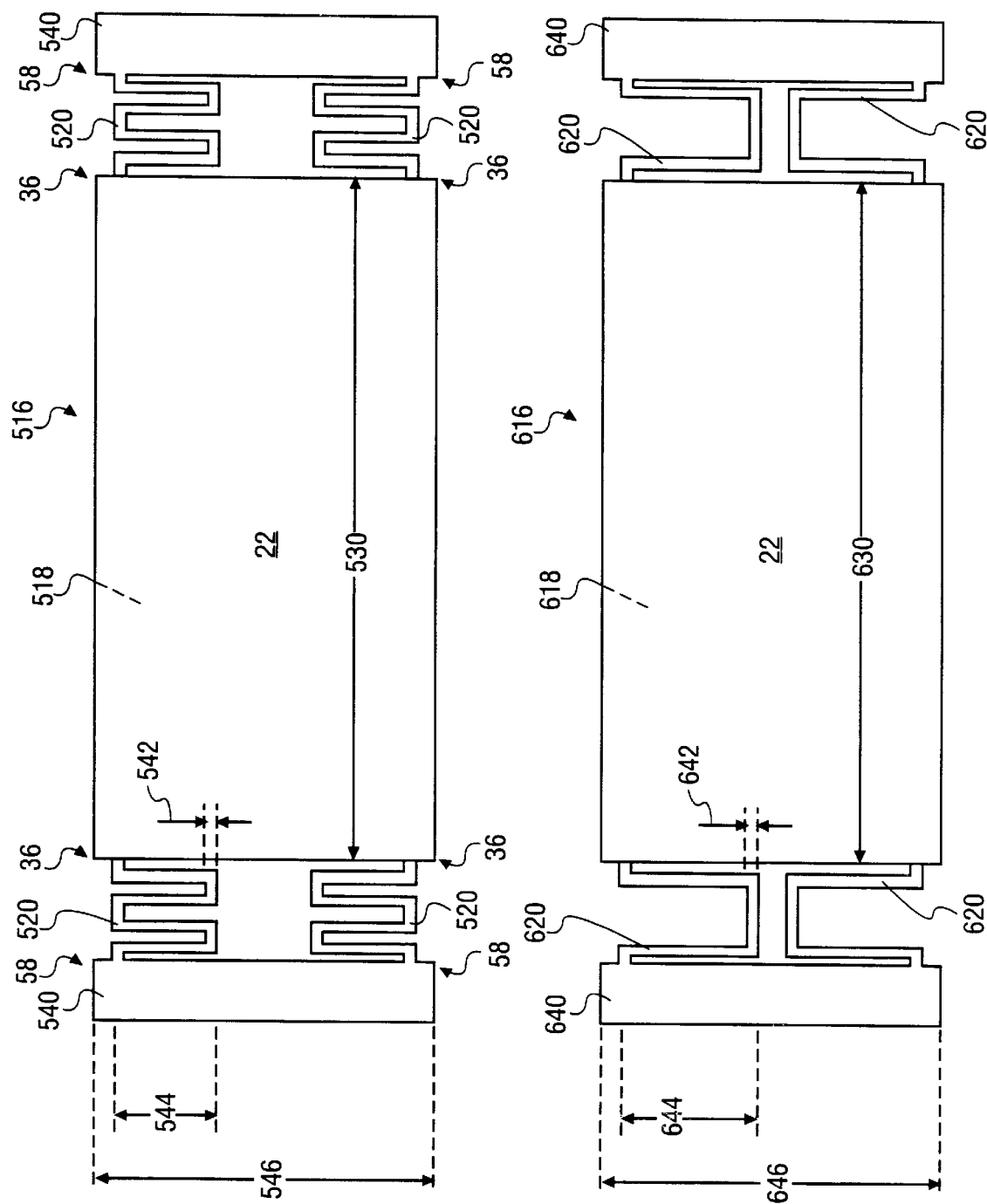

VARIABLE TUNABLE RANGE MEMS CAPACITOR

BACKGROUND OF THE INVENTION

1. Field of the Invention

The present invention relates generally to microelectromechanical structure (MEMS) fabrication, and, more specifically, the present invention relates to the fabrication of a variable capacitor that is tunable over a wide range.

2. Description of Related Art

As microelectronic technology continues to experience miniaturization and, greater device flexibility, the need has arisen for variable capacitors that can have greater capability and reliability. Prior art on-chip variable capacitors are based on varactor diode technology that have a tuning range of less than about 25%. The varactor diode technology also has a low pull-in effect.

Additionally, prior art membrane capacitors have a capacitance tunable range that is limited due to the voltage exceeding the critical voltage (Vc) thereof. At Vc, the membrane collapses and the capacitor shorts out. Additionally, due to the suspension nature of the prior art capacitors, the center portion of the flexible membrane draws closer to the fixed electrode than the edge portions. This phenomenon creates a greater local capacitance at the center of the flexible membrane than at the edge portions of the flexible membrane where it is anchored.

Between capacitors, it is difficult to control capacitance change in any predictable way such as a linear or even a nonlinear functional correlation between the amount of applied direct current (DC) voltage and the resulting capacitance. Where the edge portions of the flexible membrane occupies a substantial capacitance surface area in relation to the center portion it becomes difficult to achieve an appreciable range of tunable capacitance.

What is needed is a variable capacitor that overcomes the problems in the prior art.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. In the drawings, like structures will be provided with like reference designations. In order to show the structures of the present invention most clearly, the drawings included herein are diagrammatic representations of integrated circuit structures. Thus, the actual appearance of the fabricated structures, for example in a photomicrograph, may appear different while still incorporating the essential structures of the present invention. Moreover, the drawings show only the structures necessary to understand the present invention. Additional structures known in the art have not been included to maintain the clarity of the drawings. Understanding that these drawings depict only typical embodiments of the invention that are not necessarily drawn to scale and are not therefore to be considered to be limiting of its scope, the invention will be described and explained with additional specificity and detail through the use of the accompanying drawings in which:

FIG. 5 is a top view of an alternative embodiment of the variable capacitor depicted in FIG. 1;

FIG. 6 is a top view of an alternative embodiment of the variable capacitor depicted in FIG. 1;

DETAILED DESCRIPTION OF THE INVENTION

The present invention relates to a variable capacitor that is a micro-electromechanical system (MEMS). The variable capacitor overcomes problems inherent in the prior art by stiffening a movable charge plate and by making variable capacitance a more linear function of the actuation force applied, and by accomplishing a much larger tuning range.

A first aspect of the present invention relates to the prevention of collapse of the capacitor. Thereby, the tunable range is increased over the prior art by a factor of at least two, and preferably by a factor of at least four and higher.

Figure 1:
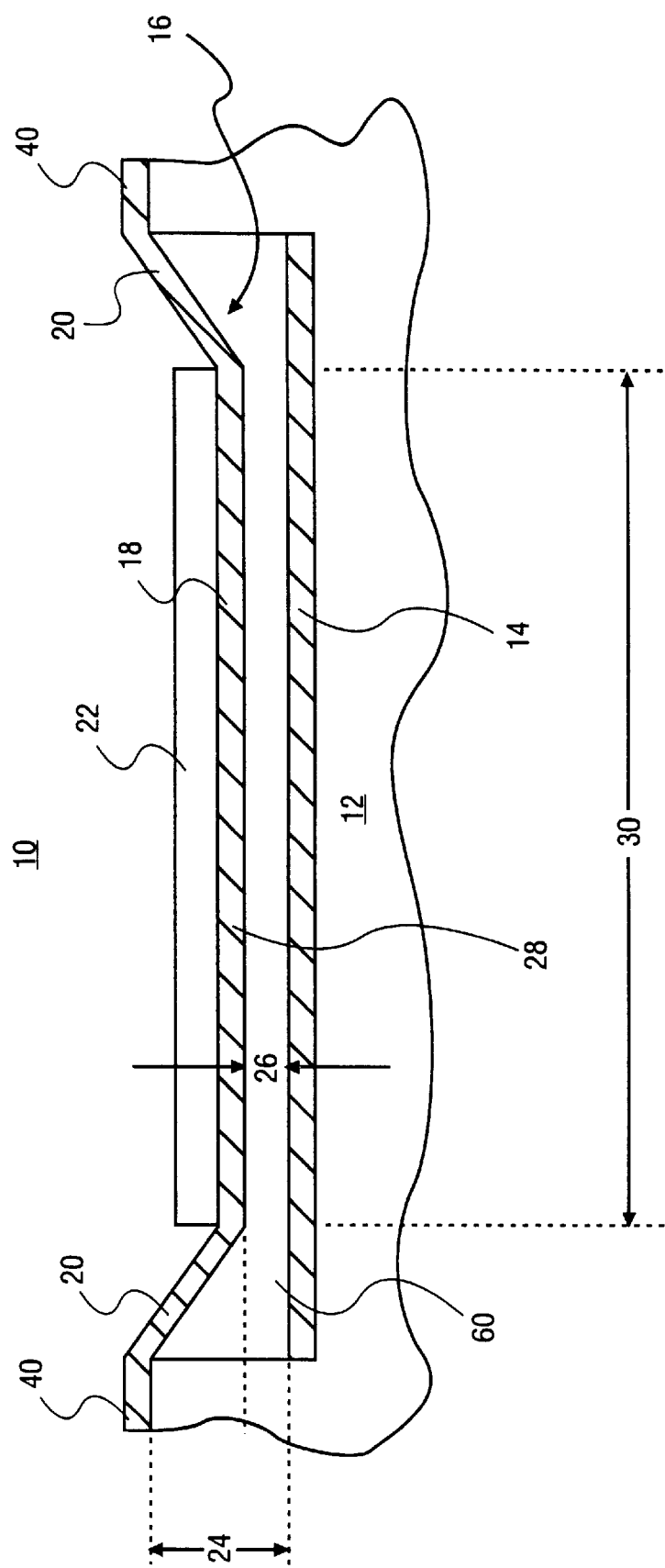
FIG. 1 is an elevational cross-section view of a variable capacitor according to the present invention.

FIG. 1 is an elevational cross-section view of the inventive variable capacitor that is designated by the reference numeral 10. FIG. 1 illustrates a substrate 12 in which a fixed charge plate 14 is disposed. A movable charge plate 16 is disposed above fixed charge plate 14. Movable charge plate 16 may be characterized by a planar portion 18, a suspension portion 20, and a terminal portion 40. Affixed to planar portion 18 of movable charge plate 16 is a stiffener 22. Stiffener 22 may occupy the same footprint as planar portion 18 of movable charge plate 16.

A first separation distance 24 is observed as the original separation distance between fixed charge plate 14 and planar portion 18 before an actuation force is applied. Similarly, a second separation distance 26 is observed between planar portion 18 of movable charge plate 16 and fixed charge plate 14 as the tunable capacitor separation distance at a given applied actuation force.

Stiffener 22 may be made of any material that causes planar portion 18 of movable charge plate 16 to resist bending. Preferably, stiffener 22 is made of silicon nitride, $Si_xN_y$, where x and y have values that make up both stoichiometric and solid solution combinations. Stiffener 22 may also be made of oxides such as silica, titania, alumina, ceria, thoria, and other oxides that make up both stoichiometric and solid solution combinations. Additionally, stiffener 22 may be made of any material, preferably dielectric, that allows the inventive structure to achieve a tunable range greater than about 30%, preferably greater than about 50%, and more preferably greater than about 100%.

Figure 2:
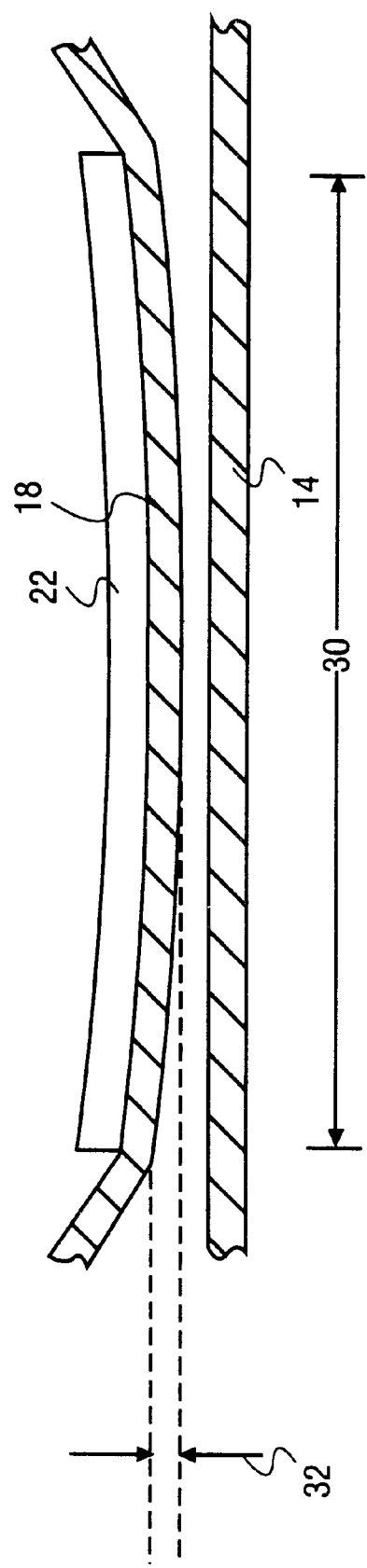
FIG. 2 is an exaggerated elevational cross-section view of the variable capacitor to illustrate relative warping of a MEMS device.

Second separation distance 26 is observed to be substantially constant. By "substantially constant," it is meant that warping of planar portion 18 of movable charge plate 16 is minimized. Relative warping is defined as a relative measure of deflection of any point along the charge surface 28 of planar portion 18 in vertical relation to any other point thereon, divided by the length 30 of planar portion. FIG. 2 is an exaggerated detail illustration of relative warping wherein the deflection difference 32, can be relatively quantified by dividing by length 30. Relative warping in the present invention may be in a range from about 30% to about 0.1%, preferably from about 10% to about 0.5% and most preferably from about 2% to about 1%.

Referring again to FIG. 1, first separation distance 24 is the measurement from terminal portion 40 of movable charge plate 16 to down to fixed charge plate 14. Suspension portion 20 of movable charge plate 16 is separated from fixed charge plate 14 over a variable distance that is at a maximum at first separation distance 24 and at a minimum at second separation distance 26. Consequently, removing material in this portion preferably reduces capacitance for suspension portion 20.

Figure 3:
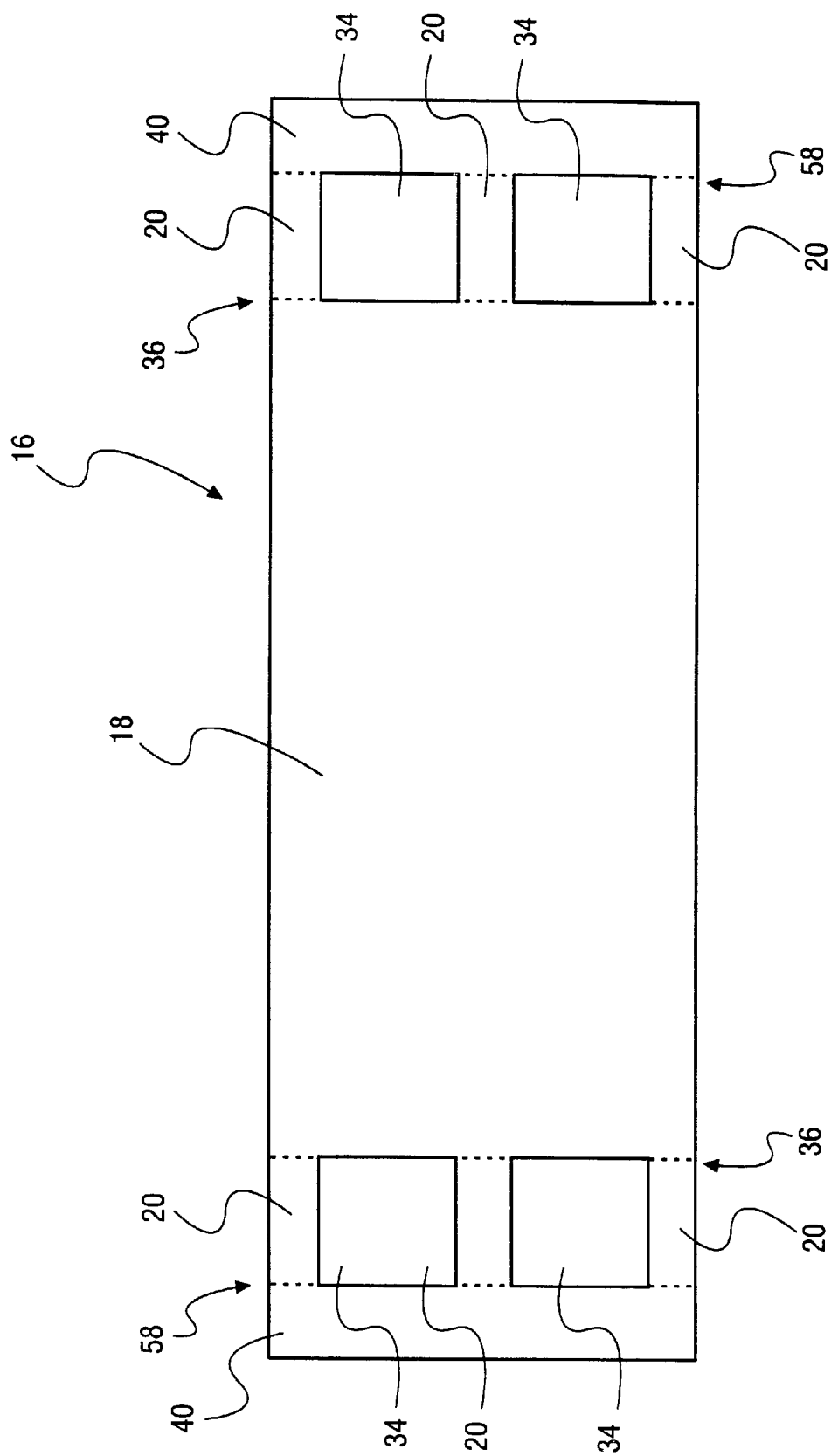
FIG. 3 is a top cut-away view of the variable capacitor depicted in FIG. 1.

FIG. 3 is a top view of variable capacitor 10 that further illustrates the present invention. Stiffener 22 has been removed to further illustrate movable charge plate 16. Movable charge plate 16 is seen as comprising planar portion 18 and suspension portion 20 that meet an angle at a bend depicted by the dashed line 36, and terminal portion 40. Terminal portion 40 and suspension portion 20 also meet at an angle at a bend depicted by the dashed line 58.

FIG. 3 illustrates that suspension portion 20 may contain through holes 34 to form a broken surface suspension of planar portion 18. The broken surface of suspension portion 20 of movable charge plate 16 reduces capacitance surface area for that section of movable charge plate 16 by reducing the amount of charge surface area that is present at the variable first separation distance 24. Thereby the broken surface of suspension portion 20 allows for better control of the variable capacitor quality of the present invention. Additionally, because there, is less material that must bend in suspension portion 20 when it has a broken surface suspension, movable charge plate 16 is more pliable and therefore more easily tunable. It is understood that suspension portion 20 may also be solid. Where suspension portion 20 has a broken surface, fixed charge plate 14 has a first surface area and movable charge plate 16 has a second surface area that is smaller than the first surface area.

In a preferred embodiment, the capacitor according to the present invention has a movable charge plate that is divided into a solid surface charge plate portion and a broken surface suspension.

Figure 4:
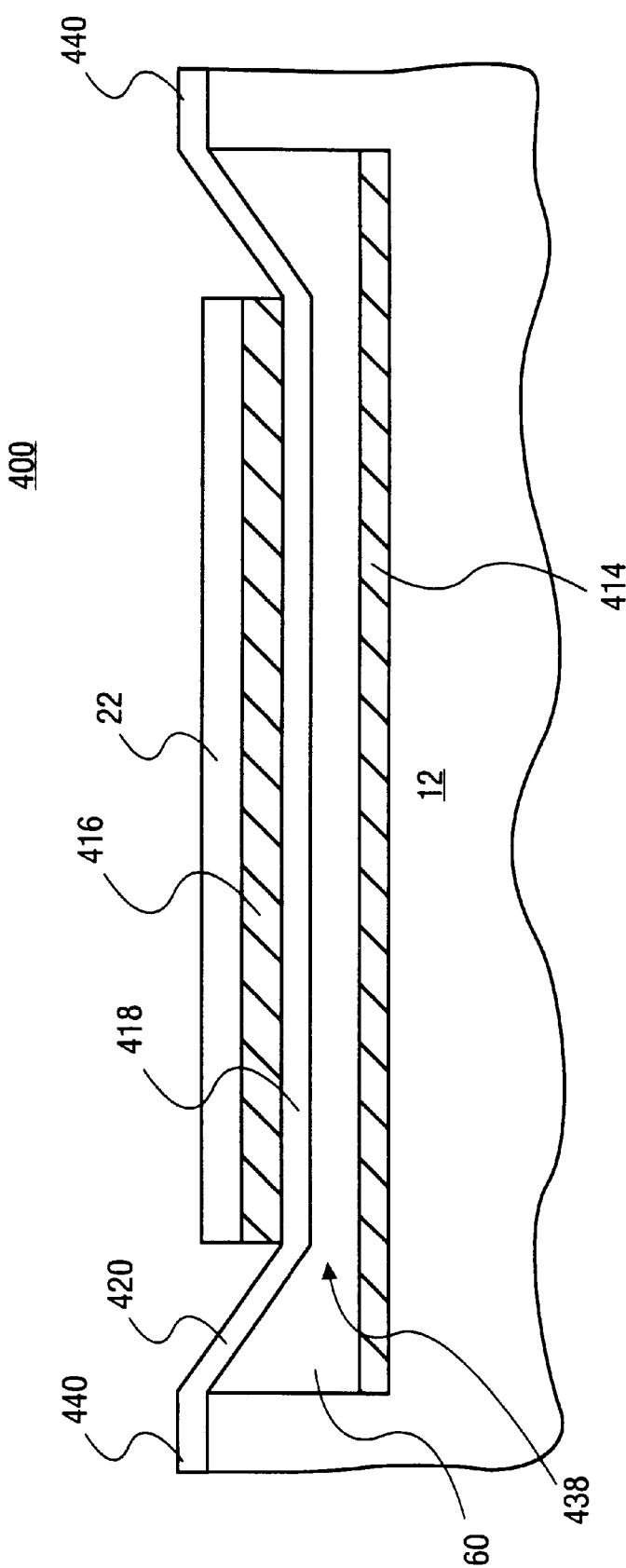
FIG. 4 is an elevational cross-section view of another embodiment of the variable capacitor.

FIG. 4 is an elevational cross-section view of another variable capacitor 400 that illustrates another embodiment of the present invention. FIG. 4 illustrates a flexible dielectric material 438 that has a movable charge plate 416 disposed thereon and that is suspended above a fixed charge plate 414. It is noted that movable charge plate 416 cannot make electrical contact with fixed charge plate 414 because flexible dielectric material 438 is interposed therebetween.

In this embodiment, flexible dielectric material 438 is divided into a planar subsection 418, a suspension subsection 420, and a terminal subsection 440. A stiffener 22 is disposed upon flexible dielectric material 438. Stiffener 22 has a footprint that may be substantially the same as movable charge plate 416 as well as planar subsection 418. Movable charge plate 416 is interposed between stiffener 22 and planar subsection 481. Although stiffener 22 is illustrated as entirely cloaking movable charge plate 416 from a cross-section view in FIG. 4, it is understood that stiffener 22 may have a footprint that is larger, the same as, or smaller than movable charge plate 416. Where stiffener 22 is larger, it may be larger by a factor range from about 1.01 to about 2, preferably from about 1.1 to about 1.5.

In the process of forming at least one through hole 34 (not pictured in FIG. 4) in the flexible dielectric 438 below the movable charge plate 416, the at least one through hole 34 has an area, relative to the total area of flexible dielectric 438, in a range from about 1% to about 50%, preferably from about 10% to about 40%.

FIG. 5 is another embodiment of the present invention. In this embodiment, a stiffener 22 is superimposed over a movable charge plate 516. In this embodiment, stiffener 22 obscures the planar portion 518 of movable charge plate 516. In this embodiment, the suspension portion 520 of movable charge plate 516 forms a spring in the shape of an undulating suspension between planar portion 518 and the terminal portion 540 of movable charge plate 516. By this embodiment, greater flexibility may be achieved for the actuation of planar portion 518 of movable charge plate 516. FIG. 5 illustrates suspension portion 520 with "W" and "M" shapes.

Figure 7:
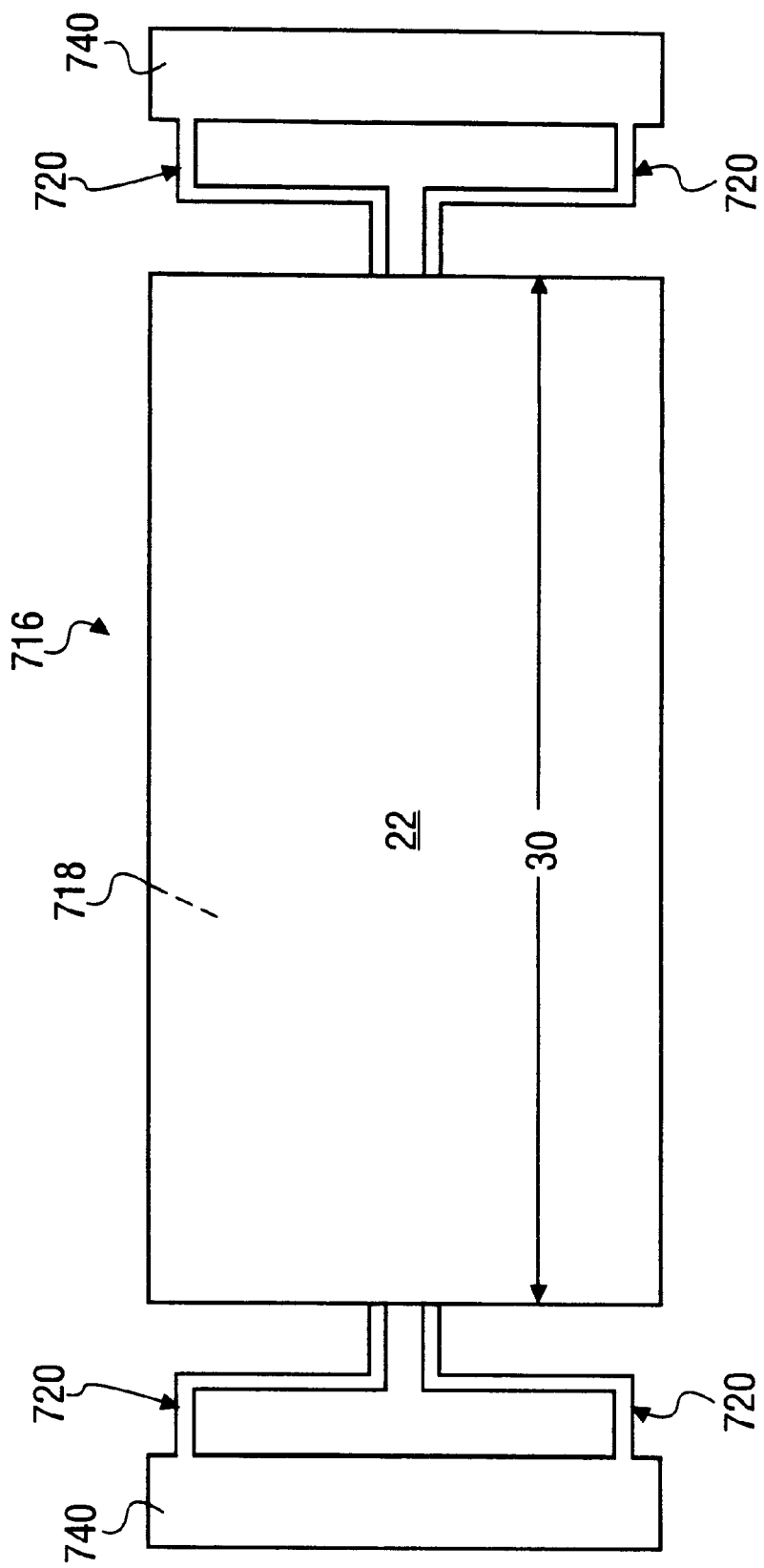
FIG. 7 is a top view of an alternative embodiment of the variable capacitor depicted in FIG. 1.

Although these shapes are one preferred embodiment, simpler or more complex shapes may be achieved. One example of a simpler shape is illustrated in FIG. 6. In FIG. 6, suspension 620 has both "U" shaped and an inverted horseshoe shaped undulating connections between planar portion 618 and the terminal portion 640 of movable charge plate 616. Another example of a simpler shape is illustrated in FIG. 7. In FIG. 7, suspension portion 720 has both "S" and backward "S" shapes that undulate between planar portion 718 and the terminal portion 740 of movable charge plate 716.

Although the undulating suspensions 520, 620, and 720 depicted in FIGS. 5, 6, and 7 are presented as portions of movable charge plates 516, 716, and 716, respectively, it is understood that the undulating suspensions 520, 620, and 720 may also be integral portions of flexible dielectric materials. The integral portions of flexible dielectric materials may be for structures depicted in FIG. 4.

In an alternative embodiment, the undulating configuration that constitutes the suspension portion of the flexible dielectric, may be a continuous undulating structure that extends across the planar portion of the movable charge plate to create a multiple channel open configuration. Accordingly, where FIG. 4 may illustrate a continuous undulating structure, it may begin at one terminal portion 440, continue as one suspension portion 420, continue as planar portion 418, and finish as the other suspension portion 420 and terminal portion 440, respectively.

Different degrees of flexibility are achieved by the particular material used, whether charge plate material or flexible dielectric material, and by the dimensions of the undulating structures. For example, suspension portion 520 of movable charge plate 516 has a thickness 542 and amplitude 544 that may be related to the length 530 and/or the width 546 of movable charge plate 516. Similarly, the suspension portion 620 of movable charge plate 616 has a thickness 642 and amplitude 644 that may be related to the length 630 and/or the width 646 of movable charge plate 616.

Figure 8:
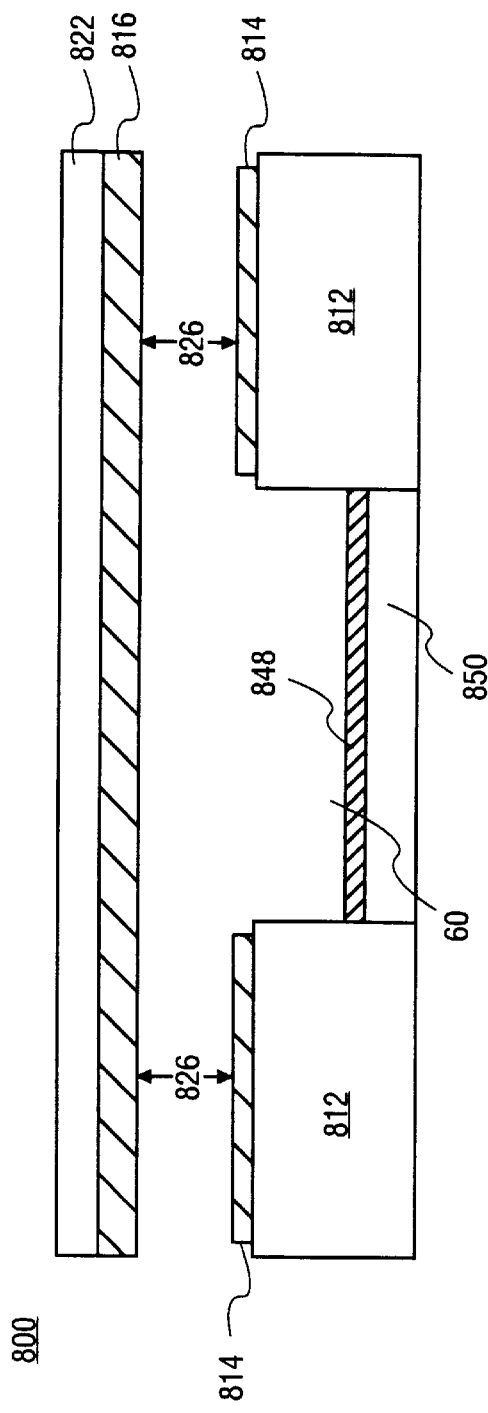
FIG. 8 is an elevational cross-section view of another embodiment of the variable capacitor.

FIG. 8 illustrates another embodiment of the present invention in which the functions of capacitance and electrostatic actuation are separated. Fixed charge plates 814 may be elevated upon the substrate 812 above an actuator plate 848. Actuator plate 848 is disposed upon a lower substrate 850. The elevation of fixed charge plates 814 may be negligible or omitted to achieve a structure where fixed charge plates 814 and fixed actuator plate 848 are at substantially the same level. For this alternative embodiment, substrates 812 and 850 may be the same level and fashioned from the same material layer in a single process step.

The movable charge plate 816 is affixed to a stiffener 822. Together, movable charge plate 816 and stiffener 822 are actuated by actuator plate 848 to establish a preferred separation distance 826 for a desired capacitance. Actuator plate 848 uses electromotive force to reposition movable charge plate 816 to a desired separation distance 826.

Figure 9:
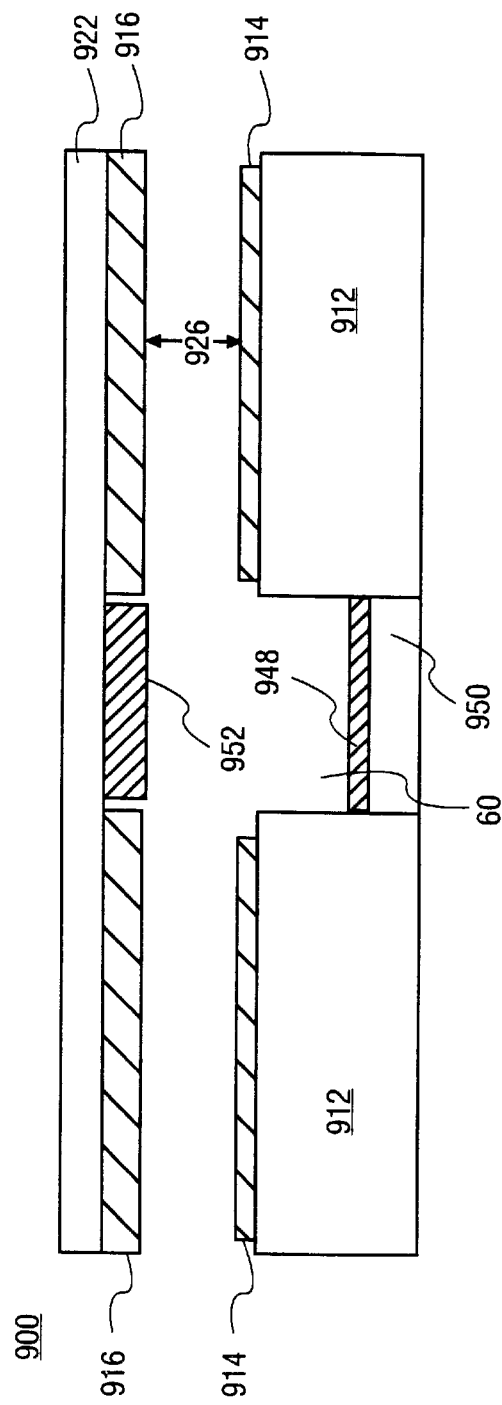
FIG. 9 is an elevational cross-section view of an alternative embodiment of the variable capacitor depicted in FIG. 8.

FIG. 9 illustrates another embodiment of the present invention similar to the embodiment depicted in FIG. 8, with the addition that there is a plurality of movable charge plates 916 that are isolated from a movable actuator plate 952. According to this embodiment, the establishment of a preferred capacitance may be carried out where the electromotive force is applied between the fixed actuator plate 948 and the movable actuator plates 952. This actuation scheme has a diminished effect, if any, upon the capacitance that is established between the fixed charge plates 914 and movable charge plates 916. Accordingly, the desired capacitance established may be more directly related to the separation distance 926.

Figure 10:
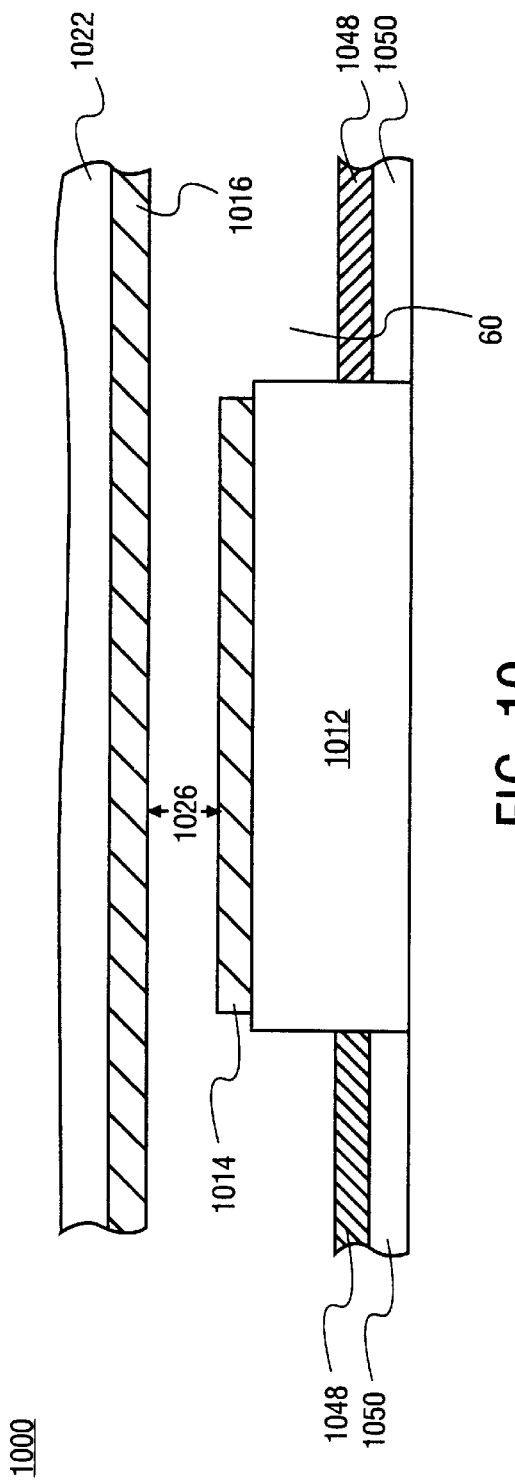
FIG. 10 is an elevational cross-section view of another embodiment of the variable capacitor.

FIG. 10 illustrates yet another embodiment of the present invention in which the functions of capacitance and electrostatic actuation are separated. A fixed charge plate 1014 may be elevated upon the substrate 1012 above an actuator plate 1048. Actuator plate 1048 is disposed upon a lower substrate 1050. The elevation of fixed charge plate 1014 may be negligible or omitted to achieve a structure where fixed charge plate 1014 and fixed actuator plate 1048 are at substantially the same level. For this alternative embodiment, substrates 1012 and 1050 may be the same level and fashioned from the same material layer in a single process step.

The movable charge plate 1016 is affixed to a stiffener 1022. Together, movable charge plate 1016 and stiffener 1022 are actuated by actuator plate 1048 to establish a preferred separation distance 1026 for a desired capacitance. Actuator plate 1048 uses electromotive force to reposition movable charge plate 1016 to a desired separation distance 1026.

Figure 11:
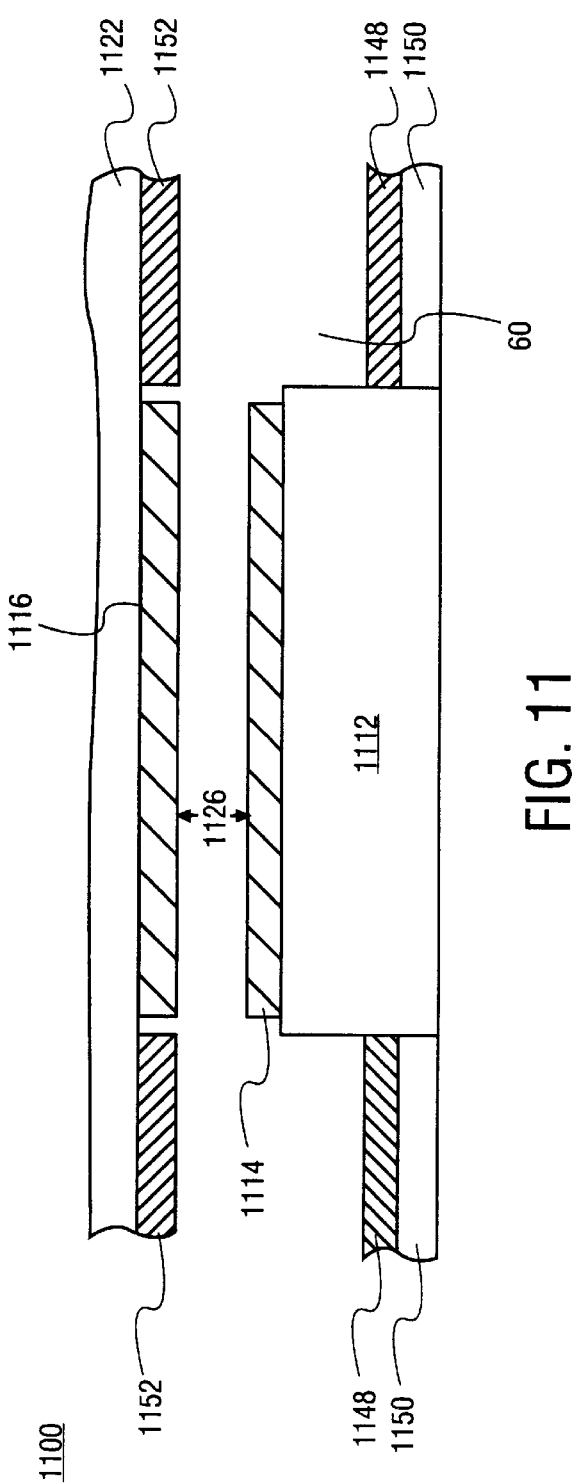
FIG. 11 is an elevational cross-section view of an alternative embodiment of the variable capacitor depicted in FIG. 10.

FIG. 11 illustrates another embodiment of the present invention similar to the embodiment depicted in FIG. 10, with the addition that the movable charge plate 1116 is isolated from movable actuator plates 1152. According to this embodiment, the establishment of a preferred capacitance may be carried out where the electromotive force is applied between the fixed actuator plate 1148 and the movable actuator plate 1152. This actuation scheme has a diminished effect, if any, upon the capacitance that is established between the fixed charge plate 1114 and movable charge plate 1116. Accordingly, the desired capacitance established may be more directly related to the separation distance 1126.

In the embodiments set forth in FIGS. 8, 9, 10 and 11, it is understood that suspension of the movable charge plate may be carried out by the suspension portion embodiments as set forth in this disclosure. Additionally, other suspension schemes may be used for this embodiment of the invention.

In the forgoing embodiments, the suspension sections 20, 420, 520, 620, and 720 are examples of a means for suspending the movable charge plate. In the forgoing embodiments, the fixed charge plates 14, 414, 848, 948, 1048, and 1148 are examples of a means for moving the movable charge plate.

Figure 12:
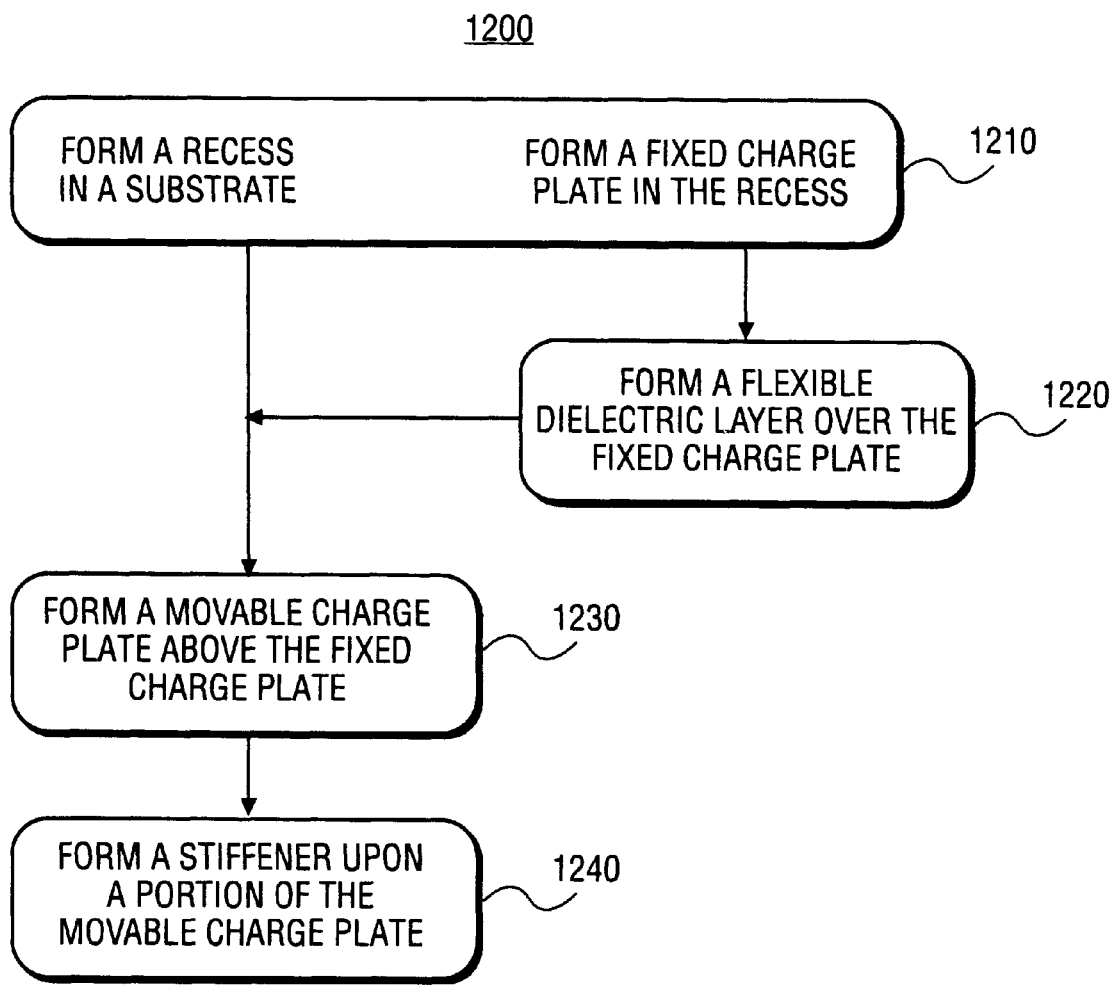
FIG. 12 is a process flow diagram that illustrates the inventive method.

The variable capacitor is made according to an inventive method 1200 that is illustrated in FIG. 12. A recess 60 is formed in substrate 12 as depicted in FIG. 1. Recess 60 may be formed of a single etch, or it may be part of a damascene structure. Fixed charge plate 14 is formed in recess 60 by deposition such as chemical vapor deposition (CVD) or physical vapor deposition (PVD). The method illustrated in FIG. 12 demonstrates that formation of the recess and the fixed charge plate may be contemporaneous as depicted in flow block 1210. Movable charge plate 16 is formed above fixed charge plate 14 as depicted in process flow block 1230. Movable charge plate 16 is formed by a method such as filling recess 60 with a temporary material, depositing movable charge plate 16, and wet etching the temporary filler material that filled recess 60. Stiffener 22 is formed upon a portion of movable charge plate 16 as depicted in flow block 1240. Where patterning of at least a portion of movable charge plate 16 precedes removal of filler material in recess 60, patterning of multiple through-holes 34 or any one of the undulating suspension sections as disclosed herein, will facilitate removal of the filler material.

The variable capacitor 400 illustrated in FIG. 4 is formed in a manner similar to variable capacitor 10. Prior to formation of movable charge plate 416, flexible dielectric layer 438 is formed upon a filler material that is to be removed to form recess 60 as depicted in process flow block 1220. After flexible dielectric layer 438 is formed, patterning may precede or follow removal of the filler material disposed in recess 60. Where patterning of flexible dielectric layer 438 precedes removal of the filler material in recess 60, patterning of any one of the undulating suspension sections as disclosed herein, will facilitate removal of the filler material.

The variable capacitor 800 depicted in FIG. 8 is formed by forming lower substrate 850 in recess 60 and forming fixed actuator plate 848 upon lower substrate 850. Elevated substrate 812 is formed either by depositing or etching into a portion of recess 60. Fixed charge plate 814 is formed upon elevated substrate 812 and a filler material to be removed fills recess 60 during the formation of flexible dielectric layer (not pictured) according to embodiments set forth herein. Where fixed charge plate 814 and fixed actuator plate 848 are at the same height, they may be patterned from the same metal layer. Variable capacitor 900 is formed by a similar method with the added limitation that a metal layer is patterned to form movable charge plates 916 and movable actuator plate 952.

The variable capacitor 1000 depicted in FIG. 10 is formed by forming lower substrate 1050 in recess 60 and forming fixed actuator plate 1048 upon lower substrate 1050. Elevated substrate 1012 is formed either by depositing or etching into a portion of recess 60. Fixed charge plate 1014 is formed upon elevated substrate 1012 and a filler material to be removed fills recess 60 during the formation of flexible dielectric layer (not pictured) according to embodiments set forth herein. Where fixed charge plate 1014 and fixed actuator plate 1048 are at the same height, they may be patterned from the same metal layer. Variable capacitor 1100 is formed by a similar method with the added limitation that a metal layer is patterned to form movable charge plate 1116 and movable actuator plate 1152.

Distinct advantages exist for the present invention. One advantage is that a tunable range is achieved that was not achievable in the prior art. Because of the presence of a stiffener as disclosed herein, the critical gap between the movable charge plate and the fixed charge plate can be smaller than what was allowable in the prior art. Consequently, the tunable range of the variable capacitor may be more than 100%. As applied to wireless technology, by way of non-limiting example, the variable capacitor of the present invention may enable a wireless device to operate at multiple bands such as 900 MHz, 1.9 GHz, and 2.4 GHz. Thus, transceiver design may be changed to enable the same variable capacitor to be used for the various frequencies.

Another advantage is that the establishment and control over a preferred capacitance is more predictable and therefore more reliable. The presence of the stiffener and the broken surface suspension significantly reduces the capacitance that does not change near the terminal ends of variable capacitors of the prior art. Further, the separation of actuation and capacitance as disclosed herein allows for greater control It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method of forming a variable capacitor comprising:
   forming a recess in a substrate;
   forming a fixed charge plate in the recess;
   forming a movable charge plate above the fixed charge plate;
   forming a stiffener upon a portion of the movable charge plate.

2. The method of forming a variable capacitor according to claim 1, wherein forming a recess in a substrate further comprises:
   forming the fixed charge plate;
   forming a dielectric layer upon the fixed charge plate;
   forming a movable charge plate upon the dielectric layer; and
   removing the dielectric layer between the fixed charge plate and the movable charge plate.

3. The method of forming a variable capacitor according to claim 1, prior to forming a movable charge plate, further comprising:
   forming a flexible dielectric above the fixed charge plate.

4. The method of forming a variable capacitor according to claim 1, prior to forming a movable charge plate, further comprising:
   forming a flexible dielectric above the fixed charge plate; and
   forming multiple through holes in the flexible dielectric.

5. The method of forming a variable capacitor according to claim 1, prior to forming a movable charge plate, further comprising:
   forming a flexible dielectric above the fixed charge plate; and
   forming multiple through holes in the flexible dielectric, wherein the multiple through holes have a relative area in a range from about 1% to about 50%.

6. The method of forming a variable capacitor according to claim 1, prior to forming a movable charge plate, further comprising:
   forming a flexible dielectric above the fixed charge plate; and
   forming at least one through hole in the flexible dielectric.

7. The method of forming a variable capacitor according to claim 1, prior to forming a movable charge plate, further comprising:
   forming a flexible dielectric above the fixed charge plate; and
   forming at least one through hole in the flexible dielectric below the movable charge plate, wherein the at least one through hole has a relative area in a range from about 10% to about 40%.

8. The method of forming a variable capacitor according to claim 1, prior to forming a movable charge plate, further comprising:
   forming a flexible dielectric above the fixed charge plate; and
   patterning an undulating suspension section in at least a portion of the flexible dielectric.

9. The method of forming a variable capacitor according to claim 1 wherein prior to forming a stiffener, forming a movable charge plate further comprises:
   patterning an undulating suspension section in at least a portion of the movable charge plate.

10. The method of forming a variable capacitor according to claim 1, wherein forming a recess in the substrate further comprises:
    forming a lower substrate;
    forming a fixed actuator plate upon the lower substrate;
    forming an elevated substrate; and
    forming the fixed charge plate upon the elevated substrate.

11. The method of forming a variable capacitor according to claim 1, wherein forming a recess in the substrate further comprises:
    forming a lower substrate;
    forming a fixed actuator plate upon the lower substrate;
    forming an elevated substrate;
    forming the fixed charge plate upon the elevated substrate; and wherein forming a movable charge plate further comprises:
    patterning the movable charge plate to form movable actuator plate.

12. A method of forming a variable capacitor comprising:
    forming a recess in a substrate;
    forming a fixed charge plate in the recess;
    filling the recess with a temporary filler material;
    depositing a movable charge plate over the temporary material;
    wet etching the temporary filler material that filled the recess; and
    forming a stiffener upon the movable charge plate.

13. The method according to claim 12, wherein depositing a movable charge plate further comprises:
    patterning of at least a portion of the movable charge plate to form multiple through-holes, and followed by;
    wet etching the temporary filler material in the recess.

14. The method according to claim 12, wherein forming a stiffener further comprises:
    forming a stiffener made of silicon nitride, $Si_xN_y$, where x and y are selected from values that make up both stoichiometric and solid solution combinations.

15. The method according to claim 12, wherein forming a stiffener further comprises:

forming a stiffener made of silica selected from stoichiometric and solid solution combinations.

16. The method according to claim 12, wherein forming a stiffener further comprises:

forming a stiffener made of titania selected from stoichiometric and solid solution combinations.

17. The method according to claim 12, wherein forming a stiffener further comprises:

forming a stiffener made of alumina selected from stoichiometric and solid solution combinations.

18. The method according to claim 12, wherein forming a stiffener further comprises:

forming a stiffener made of ceria selected from stoichiometric and solid solution combinations.

19. The method according to claim 12, wherein forming a stiffener further comprises:

forming a stiffener made of thoria selected from stoichiometric and solid solution combinations.

20. The method according to claim 12, further comprising:

forming a flexible dielectric above the fixed charge plate.

21. The method according to claim 12, prior to depositing a movable charge plate, further comprising:

forming a flexible dielectric above the fixed charge plate; and forming multiple through holes in the flexible dielectric, wherein the multiple through holes have an area, relative to the total area of flexible dielectric in a range from about 1% to about 50%.

22. The method according to claim 12, prior to depositing a movable charge plate, further comprising:

forming a flexible dielectric above the fixed charge plate; and forming at least one through hole in the flexible dielectric.

23. The method according to claim 12, prior to depositing a movable charge plate, further comprising:

forming a flexible dielectric above the fixed charge plate; and forming at least one through hole in the flexible dielectric below the movable charge plate, wherein the at least one through hole has an area, relative to the total area of flexible dielectric in a range from about 10% to about 40%.

24. The method according to claim 12, prior to depositing a movable charge plate, further comprising:

forming a flexible dielectric above the fixed charge plate; and patterning an undulating suspension section in at least a portion of the flexible dielectric.

25. The method according to claim 12 wherein prior to forming a stiffener, forming a movable charge plate further comprises:

patterning an undulating suspension section in at least a portion of the movable charge plate.

26. The method according to claim 12, wherein forming a recess in the substrate further comprises:

forming a lower substrate;

forming a fixed actuator plate upon the lower substrate;

forming an elevated substrate; and forming the fixed charge plate upon the elevated substrate.

27. The method according to claim 12, wherein forming a recess in the substrate further comprises:

forming a lower substrate;

forming a fixed actuator plate upon the lower substrate;

forming an elevated substrate;

forming the fixed charge plate upon the elevated substrate; and wherein forming a movable charge plate further comprises:

patterning the movable charge plate to form movable actuator plate.

28. The method according to claim 12, wherein forming a stiffener further comprises:

forming stiffener that has a top plan view footprint that is substantially the same as the top plan view footprint of the movable charge plate.

29. The method according to claim 12, wherein forming a stiffener further comprises:

forming stiffener that has a top plan view footprint that is substantially smaller than the top plan view footprint of the movable charge plate.

30. The method according to claim 12, wherein forming a stiffener further comprises:

forming stiffener that has a top plan view footprint that is substantially larger than the top plan view footprint of the movable charge plate.

31. The method according to claim 12, wherein forming a stiffener further comprises:

forming stiffener that has a top plan view footprint that is larger than the top plan view footprint of the movable charge plate in a range from about 1.01 to about 2.

32. The method according to claim 12, wherein forming a stiffener further comprises:

forming stiffener that has a top plan view footprint that is larger than the top plan view footprint of the movable charge plate in a range from about 1.1 to about 1.5.

* * * * *